BEST AVAILABLE COP'

E. HOLMES & H. C. ROOME,
Assignor, by mesne assignments, to the HOLMES BURGLAR ALARM TELEGRAPH CO.

Electrical-Envelope for Safes, Vaults, &c.

No. 8,949. Reissued Oct. 28, 1879.

*Witnesses:*
Hermann Dichling
Geo. A. Smith

*Inventor:*
Edwin Holmes &
Henry C. Roome
by Saml. A. Duncan
atty.

BEST AVAILABLE COPY

UNITED STATES PATENT OFFICE.

EDWIN HOLMES, OF BROOKLYN, NEW YORK, AND HENRY C. ROOME, OF JERSEY CITY, NEW JERSEY, ASSIGNORS, BY MESNE ASSIGNMENTS, TO HOLMES BURGLAR ALARM TELEGRAPH COMPANY, OF NEW YORK CITY.

IMPROVEMENT IN ELECTRICAL ENVELOPES FOR SAFES, VAULTS, &c.

Specification forming part of Letters Patent No. 110,362, dated December 20, 1870; Reissue No. 8,949, dated October 28, 1879; application filed October 8, 1879.

DIVISION A.

*To all whom it may concern:*

Be it known that we, EDWIN HOLMES, of the city of Brooklyn, in the State of New York, and HENRY C. ROOME, of Jersey City, in the county of Hudson and State of New Jersey, have invented a new and useful Electro-Magnetic Envelope or Lining for Safes, Vaults, and other Structures, of which the following is a full, clear, and exact description, reference being had to the accompanying drawings, forming part of this specification, and in which—

Figure 1:
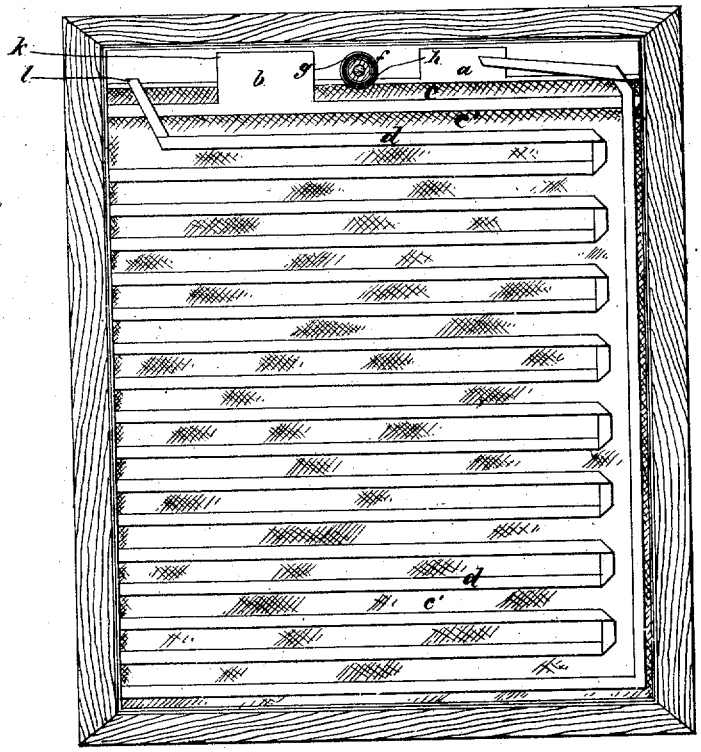
Figure 2:
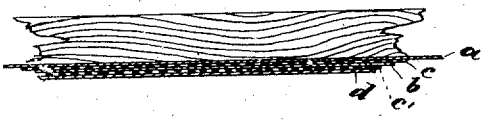

Figure 1 represents an interior face view of our improved envelope or lining as applied to one side of a safe or vault, or wooden case inclosing the same, and Fig. 2 a transverse section thereof in part.

Similar letters of reference indicate corresponding parts.

Our invention relates to electro-magnetic attachments to safes, vaults, and other structures or inclosures which it may be desired to protect against burglary or other improper interference; and, in general, it consists in so constructing and arranging an electric envelope or an electric lining for such structure that when it is properly connected with a battery and an alarm apparatus any perforation of it, as well as any severing of its connection with the battery, will cause the alarm apparatus to give a signal.

To this end the invention comprises a combination of the electric envelope or lining with a galvanometer or instrument the movements of which are produced by variations in a current of electricity from a battery or other electrical apparatus in connection with the safe, vault, or other structure to be protected. Said invention also includes a peculiar construction of the envelope or lining, which is made of separate parts connected with the opposite poles of the battery, and which are imperfectly insulated from each other, or are connected with each other by a resistance-coil or other resisting medium. These two parts, as more particularly involved in that phase of the invention which forms the special subject of the present division of this Reissue, consist of thin layers of some good conducting material, these layers being wholly or partially insulated from each other by some suitable interposed material, to which they may be glued or cemented so as to form a single compound sheet.

Referring to the accompanying drawings, *a* and *b* represent two thin and pliable plates of sheet metal, which may be so separated from each other by a thin interposed sheet, *c*, as to allow a slight current of electricity to pass from one to the other when the plates are connected with the opposite poles of battery. This effect may be produced either by making the interposed sheet *c* out of a partial or poor conductor, or, if a non-conductor, by making it so thin in one or more places that it will allow of the passage of a slight current through it at such point or points.

A like effect may be produced by interposing between the plates *a* and *b* a non-conducting material, and then connecting the plates by means of a resistance coil or medium, *f*, which last, for the purpose of more clearly explaining the principle of the invention, is the arrangement shown in the drawings.

The insulator *c* we prefer to make of cloth or paper properly coated with gum-shellac, so that it, like the metallic conductors between which it is placed, will be pliable, whereby the whole may be applied in the form of a continuous sheet as an envelope or a lining to a safe, vault, or other structure, or to the inside of a covering surrounding the same.

The envelope or lining thus prepared having been fitted and placed in position relatively to the walls of the structure which it is designed to protect, one part thereof, as *a*, is connected with one pole of the battery by means of the conductor *l*, and the other part, *b*, is similarly connected with the other pole of the battery by the conductor *k*, while the resistance-coil *f* is connected with the members *a* and *b*, respectively, at the points *h* and *g*.

As shown in the drawings, the conductor *l* connects directly with one end of a thin and frangible metallic ribbon, the other end of which is in contact with the plate *a*. This ribbon is arranged in convolutions, or in a

BEST AVAILABLE COPY zigzag manner, over the entire face of the surface to be protected, and is insulated from the underlying metal by an interposed sheet, $c'$, of some non-conducting material; but, as the making of this part of the envelope or lining in the form of a ribbon has no necessary relation to the construction to which the present division of this Reissue pertains, and in no material respect modifies the action of the two parts $a$ and $b$, (for which reason it is made the special subject of another division, B, of this reissue,) it is manifest that, for the purposes of the present patent, this ribbon may be regarded simply as a part of the conductor $l$, which connects the battery with the plate $a$; or, which practically is the same thing, so far as concerns this patent, this ribbon may be regarded as a mere extension of the plate $a$, and thus as constituting a part of one member of the electric lining, which, in a general way, is made up of two members or conductors joined by an interposed resistance coil or medium.

When the wires are connected, as described, with the poles of the battery and with the two parts or members of the envelope or lining, a slight current of electricity, passing over the wire $l$ to the part $a$, flows through the resistance-coil to the part $b$, and thence, by the wire $k$, back to the battery, or vice versa, in its course becoming diffused over the entire surface to be protected.

Any attempt to perforate the envelope or lining with a metallic instrument would establish a perfect electrical connection between the parts $a$ and $b$, and the current being no longer obliged to pass through the resistance-coil, the flow would be greatly increased, with a corresponding movement in the needle of the galvanometer, or in the instrument used to indicate the condition of the safe and give an alarm.

In like manner, if, instead of a resistance-coil between the parts $a$ and $b$, an imperfectly-insulating sheet or other medium, as above suggested, be used, the perforation of the envelope or lining with a metallic instrument would completely destroy the insulation and instantly give an increased flow to the current of electricity.

Should an entrance be attempted by using a non-conducting instrument, it is likely that even then the metal of one of the parts of the envelope or lining would at some point be forced into contact with the metal of the other part, and thus establish direct and free electrical connection between the two.

The use of the ribbon $d$ stretched over the same surface as the plates $a$ and $b$ (with a thin insulation between it and them, as above described) would increase the difficulty of perforating the lining with any kind of an instrument without establishing a direct metallic connection between the different layers of the lining. In fact, so far as concerns this result, a layer composed of the metallic ribbon would not differ materially from one composed of a continuous metallic sheet, since, practically, a burglar would find it as difficult with the ribbon as with the continuous sheet to avoid establishing a connection between it and an underlying sheet or layer of metal.

It is thus seen that an important incident in the construction of the envelope or lining, as here shown, is that, while made up of at least two metallic parts or members, these members overlie one another, being separated only by a thin sheet of other material—either a non-conductor, when a resistance-coil is used, or, when the coil is not used, a poor conductor capable of itself of affording the needed resistance, as hereinbefore explained. This superimposing of the parts of the lining or envelope with thin interposed layers of insulating material furnishes ample security against short-circuiting the conductors inside the safe or other structure in such way as to isolate a portion of the walls of the structure without cutting the resistance-coil out of the circuit. Again, where a resistance coil or medium is introduced into that portion of the circuit which forms the envelope or lining, any tampering with the battery-connections outside, with view to cutting the safe out from the circuit, would either interrupt the current altogether or change its intensity, the first result taking place when either of the wires is simply cut, and the second when the wires are short-circuited; and, in the latter case, even if a resistance-coil should be placed in the new circuit, it could not be expected to prevent a fluctuation in the strength of the current, since it is to be presumed that the intermeddler, not having access to the resistance-coil of the original circuit, would be uninformed as to its construction and arrangement, and so would be unable to substitute for it, when establishing his new circuit, a resistance of equal power, and consequently the result would be a change in the intensity of the transmitted current, and this would be attended with a corresponding movement of the needle of the galvanometer and of the other parts of the alarm apparatus.

To obtain an alarm from the fluctuation or stoppage of the current as above produced, it only requires to connect the wires $k$ and $l$ with a galvanometer or instrument the movements of which are produced by variations in a current of electricity from a battery or other electrical apparatus in connection with the safe, vault, or other structure. A bell in connection with the apparatus may be used to sound the alarm.

Of course it is to be understood that the galvanometer and alarm, as well as the battery, are to be placed at any required distance from the structure to be protected.

We are aware that others have proposed to effect the protection of safes and similar structures by covering the surfaces of the same with wire conductors, through which a current of electricity was to be passed, with a magnet introduced into the circuit at the proper point,

BEST AVAILABLE COP circuit being broken by the cutting or rupturing of the conductor; but we are not aware that any such prior system involved the use, in connection with that portion of the circuit which constitutes the envelope or lining, of a resistance coil or medium, and the use elsewhere in the circuit of a galvanometer or instrument capable of indicating by its movements not only the interruption of the current by the absolute breaking of the circuit, but also any variation of its intensity, in either direction, consequent upon any change in the condition of the circuit other than the cutting or breaking of the conductors.

What, therefore, is claimed as new is—

1. The combination of an electric envelope or lining for safes, vaults, and other structures with a galvanometer or instrument the movements of which are produced by variations in a current of electricity passing from a battery or other electrical apparatus through such envelope or lining, substantially as and for the purpose set forth.

2. An envelope or lining for safes, vaults, or other structures, composed of two overlying parts or conductors imperfectly insulated from each other, or connected with each other through a resistance coil or medium, and in connection with the opposite poles of a battery or other electrical apparatus, for action as specified.

3. An electric envelope or lining for safes, vaults, and other structures, composed of thin and pliable sheets or layers of metal wholly or partially insulated from each other by a pliable non-conductor, so that when the parts are glued or cemented together the whole forms a single sheet, substantially as specified.

4. The combination of an electric envelope or lining for safes, vaults, and other structures and a resistance coil or medium connected therewith, substantially as and for the purpose described.

EDWIN HOLMES.
HENRY C. ROOME.

Witnesses:
ROBERT H. DUNCAN,
BENJ. A. SMITH.